(12) United States Patent
Chi et al.

(10) Patent No.: US 12,626,987 B2
(45) Date of Patent: May 12, 2026

(54) BUFFER MEMBER FOR A BATTERY MODULE, AND BATTERY PACK AND AUTOMOBILE INCLUDING SAME

(71) Applicant: LG ENERGY SOLUTION, LTD., Seoul (KR)

(72) Inventors: Ho-June Chi, Daejeon (KR); Hang-June Choi, Daejeon (KR); Jeong-O Mun, Daejeon (KR); Jin-Yong Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 547 days.

(21) Appl. No.: 18/020,225

(22) PCT Filed: Aug. 23, 2021

(86) PCT No.: PCT/KR2021/011228
§ 371 (c)(1),
(2) Date: Feb. 7, 2023

(87) PCT Pub. No.: WO2022/085918
PCT Pub. Date: Apr. 28, 2022

(65) Prior Publication Data
US 2023/0261303 A1      Aug. 17, 2023

(30) Foreign Application Priority Data
Oct. 20, 2020    (KR) ........................ 10-2020-0136072

(51) Int. Cl.
H01M 50/242      (2021.01)
H01M 50/204      (2021.01)

(52) U.S. Cl.
CPC ....... H01M 50/242 (2021.01); H01M 50/204 (2021.01)

(58) Field of Classification Search
CPC .................................................... H01M 50/242
See application file for complete search history.

(56) References Cited

U.S. PATENT DOCUMENTS

| | | |
|---|---|---|
| 2006/0232135 A1 | 10/2006 | Kim et al. |
| 2014/0356675 A1 | 12/2014 | Lee et al. |
| 2017/0098811 A1 | 4/2017 | Kotik |
| 2017/0098855 A1 | 4/2017 | Karditsas et al. |
| 2017/0098868 A1 | 4/2017 | Kotik |
| 2018/0062127 A1 | 3/2018 | Lee et al. |
| 2020/0388805 A1 | 12/2020 | Yoo et al. |
| 2021/0242515 A1 | 8/2021 | Lee et al. |

FOREIGN PATENT DOCUMENTS

| | | |
|---|---|---|
| CN | 207896171 U | 9/2018 |
| DE | 10-2012-018091 A1 | 3/2014 |
| DE | 10-2018-113815 B4 | 2/2020 |
| JP | S5050195 A | 5/1975 |
| JP | H04113040 A | 4/1992 |

(Continued)

*Primary Examiner* — Maria Laios
*Assistant Examiner* — Jordan E Berresford
(74) *Attorney, Agent, or Firm* — Bryan Cave Leighton Paisner LLP

(57) ABSTRACT

A battery module includes a cover and a battery cell stack in the cover. The battery cell stack includes a plurality of battery cells. The battery module further includes a buffer member in contact with the battery cell stack. The buffer member is configured to communicate fluid in the buffer member.

11 Claims, 3 Drawing Sheets

(56)  References Cited

FOREIGN PATENT DOCUMENTS

| | | | |
|---|---|---|---|
| JP | H0592501 | A | 4/1993 |
| JP | H11-000956 | A | 1/1999 |
| JP | 2002542125 | A | 12/2002 |
| JP | 2003237842 | A | 8/2003 |
| JP | 2004-306407 | A | 11/2004 |
| JP | 2010-089449 | A | 4/2010 |
| JP | 2016-009585 | A | 1/2016 |
| JP | 2020-004556 | A | 1/2020 |
| JP | 2020-61210 | A | 4/2020 |
| KR | 10-0696624 | B1 | 3/2007 |
| KR | 10-2013-0062551 | A | 6/2013 |
| KR | 10-2014-0120550 | A | 10/2014 |
| KR | 10-1716884 | B1 | 3/2017 |
| KR | 10-2018-0025643 | A | 3/2018 |
| KR | 10-2019-0074712 | A | 6/2019 |
| KR | 10-2020-0030964 | A | 3/2020 |
| KR | 10-2020-0034221 | A | 3/2020 |
| WO | 2020/060054 | A1 | 3/2020 |

BUFFER MEMBER FOR A BATTERY MODULE, AND BATTERY PACK AND AUTOMOBILE INCLUDING SAME

CROSS-REFERENCE TO RELATED APPLICATION(S)

This is a National Phase entry pursuant to 35 U.S.C. 371 of International Application No. PCT/KR2021/011228 filed on Aug. 23, 2021, and claims priority to and the benefit of Korean Patent Application No. 10-2020-0136072 filed on Oct. 20, 2020 in the Republic of Korea, the disclosure of which is incorporated herein by reference.

TECHNICAL FIELD

The present disclosure relates to a battery module, a battery pack and a vehicle including the same, and more particularly, to a battery module that allows a uniform pressure to be applied to the entire battery cell when swelling occurs in the battery cell, a battery pack, and a vehicle including the same.

BACKGROUND ART

As technology development of and demand for mobile devices increase, the demand for secondary batteries as an energy source is rapidly increasing. Although nickel cadmium batteries or hydrogen ion batteries have been used as secondary batteries of the related art, because the batteries have almost no memory effect compared to nickel-based secondary batteries, recently, lithium secondary batteries that are freely charged and discharged, have very low self-discharge rate, and have high energy density have been widely used.

Such a lithium secondary battery mainly uses lithium-based oxides and carbon materials as positive electrode active materials and negative electrode active materials, respectively. The lithium secondary battery includes an electrode assembly in which a positive electrode plate and a negative electrode plate on which a positive electrode active material and a negative electrode active material are respectively coated are arranged with a separator interposed therebetween, and a sheath material, that is, a battery case, that seals and accommodates the electrode assembly together with an electrolyte solution.

The lithium secondary battery includes a positive electrode, a negative electrode, a separator interposed therebetween, and an electrolyte, and includes a lithium ion battery (LIB), a polymer lithium ion battery (PLIB), etc. according to which positive electrode active material and negative electrode active material are used. In general, the electrodes of the lithium secondary batteries are formed by coating a positive electrode active material or a negative electrode active material on a current collector such as an aluminum or copper sheet, a mesh, a film, or a foil, and then drying the positive electrode active material or the negative electrode active material. In addition, various types of secondary batteries have a cover capable of protecting a plurality of battery cells, and include a plurality of battery modules in which the plurality of battery cells are stacked and drawn into the cover, and a battery pack including the plurality of battery modules.

The battery cells may be electrically connected to each other through a bus bar that is a conductor. In general, a positive electrode lead is manufactured of an aluminum material, a negative electrode lead is manufactured of a copper material, and the bus bar is also manufactured of a copper material.

Meanwhile, a swelling phenomenon in which gas is generated inside a battery cell and swells may occur in the battery cell. Referring to Korean Patent Publication No. 10-2020-0106378 which is the related art, the swelling absorption pad 121 is disposed inside the module case or cover 200 to absorb volume expansion due to swelling of the battery cell.

However, in the case of the related art, when swelling occurs in a part of the battery cell rather than the entire battery cell, because the swelling absorption pad 121 is pressurized only in the part where swelling occurs, pressure is not uniform in the part of the battery cell where swelling occurs and a part of the battery cell where swelling does not occur, and because local stress is concentrated in the part of the battery cell where swelling occurs, there is a problem in that the battery cell is partially degraded.

SUMMARY

The present disclosure is designed to solve the problems of the related art, and therefore the present disclosure is directed to providing a battery module that prevents stress from being concentrated in a part of a battery cell even when swelling occurs in the battery cell, so that a uniform pressure is applied to the entire battery cell, a battery pack, and a vehicle including the same.

In one aspect of the present disclosure, there is provided a battery module including a cover, a battery cell stack in the cover, the battery cell stack comprising a plurality of battery; and a buffer member in contact with the battery cell stack, wherein the buffer member is configured to communicate fluid in the buffer member.

The buffer member may include a first sheet; a second sheet coupled to the first sheet; a plurality of fluid buffer layers formed between the first sheet and the second sheet, each of the plurality of fluid buffer layers being configured to received the fluid; and a channel between adjacent fluid buffer layers of the plurality of fluid buffer layers, the channel being configured to communicate the fluid between the adjacent plurality of fluid buffer layers.

The first sheet and the second sheet may be film sheets facilitating thermal bonding.

A plurality of channels including the channel may be provided, and the plurality of channels may connect the plurality of fluid buffer layers.

A first channel of the plurality of channels may connect a first fluid buffer layer of the plurality of fluid buffer layers to a second fluid buffer layer of the plurality of fluid buffer layers, and a second channel of the plurality of channels may connect a third fluid buffer layer the plurality of fluid buffer layers to the first channel.

All of the plurality of fluid buffer layers may be communicatively connected to each other through the first channel and the second channel, and, a fluid present in one fluid buffer layer of the plurality of fluid buffer layers may move to another fluid buffer layer of the plurality of fluid buffer layer through at least one of the first channel and the second channel when one of the plurality of battery cells swells.

The first channel is connected to the second channel in a perpendicular direction.

The plurality of fluid buffer layers may be formed in a symmetrical shape or an asymmetrical shape between the first sheet and the second sheet.

In another aspect of the present disclosure, there is provided a battery pack including the battery module described above and a vehicle including the battery module.

The embodiments of the present disclosure may prevent stress from being concentrated in a part of a battery cell by a buffer member provided to enable a movement of fluid therein even when swelling occurs in the battery cell, so that a uniform pressure is applied to the entire battery cell.

DETAILED DESCRIPTION

Figure 1:
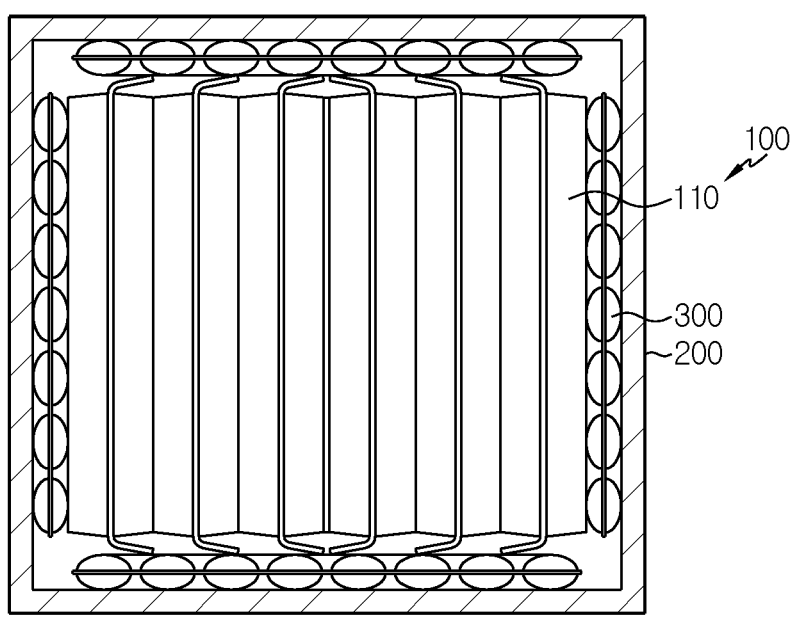
FIG. 1 is a schematic cross-sectional view of a battery module according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific portion constituting the element is exaggerated, omitted, or schematically illustrated for convenience and clarity of description. Accordingly, the size of each element does not fully reflect the actual size. If it is determined that a detailed description of a related known function or configuration may unnecessarily obscure the gist of the present disclosure, such description will be omitted.

As used herein, the term 'couple' or 'connect' includes not only a case where one member is directly coupled or directly connected to another member, but also a case where one member is indirectly coupled or indirectly connected to another member through a joint member.

Figure 2:
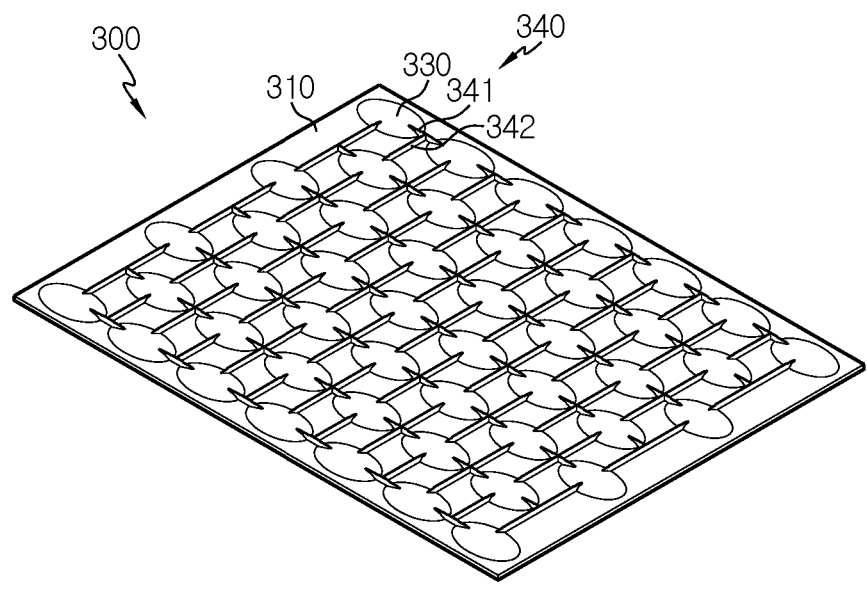
FIG. 2 is a schematic perspective view of a buffer member in the battery module according to an embodiment of the present disclosure.
Figure 3:
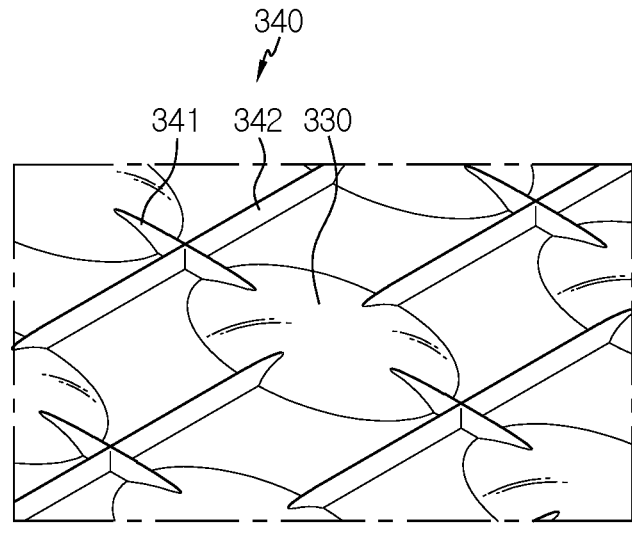
FIG. 3 is an enlarged view of a part of the buffer member of FIG. 2.
Figure 4:
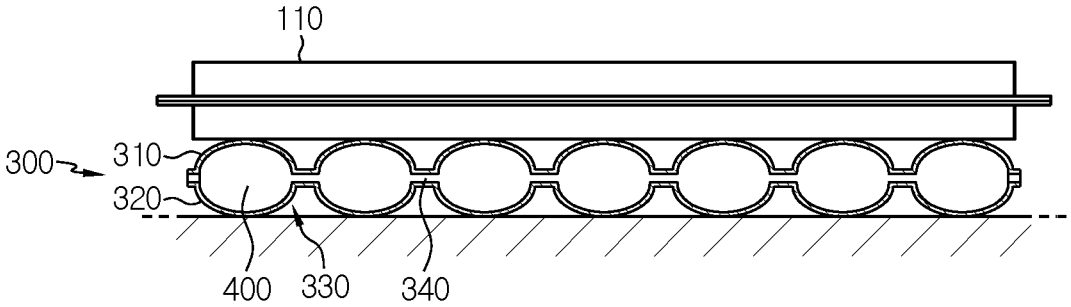
FIG. 4 schematically illustrates a first sheet and a second sheet of a fluid buffer layer formed in a symmetrical shape in the battery module according to an embodiment of the present disclosure.
Figure 5:
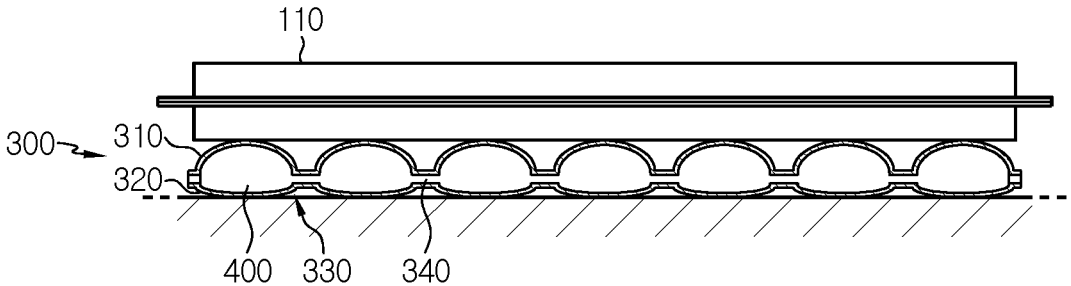
FIG. 5 schematically illustrates a first sheet and a second sheet of a fluid buffer layer formed in an asymmetrical shape as another embodiment of FIG. 4.
Figures 6, 7:
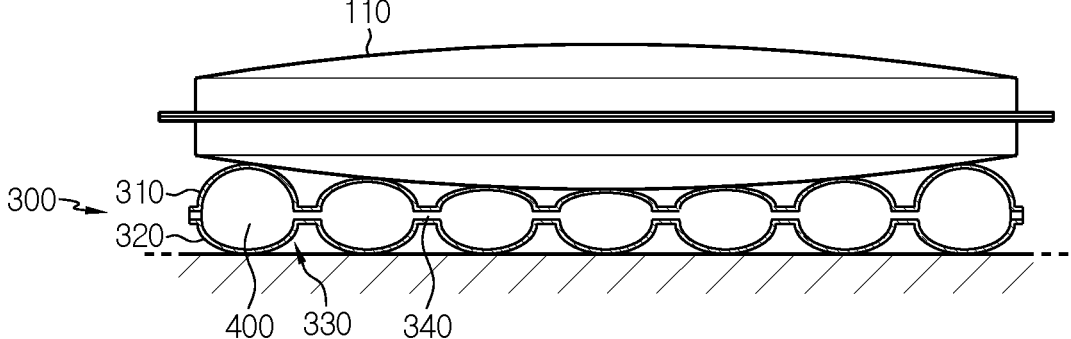
FIG. 6 schematically illustrates a case in which swelling occurs at one end of a battery cell in FIG. 4.
FIG. 7 schematically illustrates a case in which swelling occurs in the center of the battery cell in FIG. 4.

FIG. 1 is a schematic cross-sectional view of a battery module according to an embodiment of the present disclosure, FIG. 2 is a schematic perspective view of a buffer member in the battery module according to an embodiment of the present disclosure, FIG. 3 is an enlarged view of a part of the buffer member of FIG. 2, FIG. 4 schematically illustrates a first sheet and a second sheet of a fluid buffer layer formed in a symmetrical shape in the battery module according to an embodiment of the present disclosure, FIG. 5 schematically illustrates a first sheet and a second sheet of a fluid buffer layer formed in an asymmetrical shape as another embodiment of FIG. 4, FIG. 6 schematically illustrates a case in which swelling occurs at one end of a battery cell in FIG. 4, and FIG. 7 schematically illustrates a case in which swelling occurs in the center of the battery cell in FIG. 4.

Referring to the drawings, a battery module 10 according to an embodiment of the present disclosure includes a battery cell stack 100, a cover 200, and a buffer member 300.

Referring to FIG. 1, a plurality of battery cells 110 in which electrode leads are provided are stacked in the battery cell stack 100. The electrode leads provided in the battery cell 110 are a kind of terminal exposed to the outside and are connected to an external device, and may use a conductive material.

The electrode leads may include a positive electrode lead and a negative electrode lead. The positive electrode lead and the negative electrode lead may be disposed in opposite directions with respect to the longitudinal direction of the battery cell 110, or the positive electrode lead and the negative electrode lead may be located in the same direction with respect to the longitudinal direction of the battery cell 110.

The positive electrode lead and the negative electrode lead may be made of various materials. For example, the positive electrode lead may be manufactured of an aluminum material, and the negative electrode lead may be manufactured of a copper material.

The electrode leads may be electrically coupled to a bus bar. The battery cell 110 may have a structure in which a plurality of unit cells or a plurality of bi-cells are stacked according to the capacity, wherein positive electrode plate-separator-negative electrode plate are sequentially arranged in a unit cell, and positive electrode plate-separator-negative electrode plate-separator-positive electrode plate-separator-negative electrode plate are sequentially arranged in a bi-cell.

The battery cell stack 100 may be configured such that the plurality of battery cells 110 are stacked on each other. Here, the battery cells 110 may have various structures, and the plurality of battery cells 110 may be stacked in various ways.

A plurality of cartridges (not shown) respectively accommodating the battery cells 110 may be provided on the battery cell stack 100. Each cartridge (not shown) may be manufactured by injection molding of plastic, and the plurality of cartridges (not shown) in which an accommodating unit capable of accommodating the battery cell 110 is formed may be stacked.

A connector element or a terminal element may be provided on a cartridge assembly in which the plurality of cartridges (not shown) are stacked. The connector element may include, for example, various types of electrical connection components or connection members for connection to a battery management system (BMS, not shown) capable of providing data on the voltage or temperature of the battery cell 110, etc.

In addition, the terminal element includes a positive electrode terminal and a negative electrode terminal as a main terminal connected to the battery cell 110, and a terminal bolt is provided on the terminal element to be electrically connected to the outside. Meanwhile, the battery cell 110 may have various shapes.

Referring to FIG. 1, the battery cell stack 100 or a cartridge assembly in which the battery cell stack 100 is accommodated is accommodated in the cover 200. For example, the cover 200 may be provided to surround the battery cell stack 100.

The cover 200 surrounds the battery cell stack 100 or all of a plurality of cartridge assemblies, thereby protecting the battery cell stack 100 or the cartridge assemblies from external vibration or impact.

The cover 200 may be formed in a shape corresponding to the shape of the battery cell stack 100 or the cartridge assembly. For example, when the battery cell stack 100 or the cartridge assembly is provided in a hexahedral shape, the cover 200 may also be provided in the hexahedral shape to correspond thereto.

The cover 200 may be manufactured by, for example, bending a plate of a metal material, or may be manufactured by plastic injection mold. Also, the cover 200 may be manufactured integrally or may be manufactured separately.

A penetration unit (not shown) through which the connector element or the terminal element described above may be exposed to the outside may be formed in the cover 200. That is, the connector element or the terminal element may be electrically connected to a predetermined external component or member, and the penetration unit may be formed in the cover 200 so that the electrical connection is not obstructed by the cover 200.

The cover 200 may be integrally formed, or may include an upper cover 200, a lower cover 200, and a side cover 200, but is not limited thereto.

The buffer member 300 is in contact with the battery cell stack 100, and is provided so that a fluid 400 (see FIG. 4) inside the buffer member 300 is movable.

Referring to FIGS. 2 to 4, the buffer member 300 may include a first sheet 310, a second sheet 320, fluid buffer layers 330, and channels 340.

The first sheet 310 and the second sheet 320 may be provided as, for example, film sheets capable of thermal bonding. In addition, the first sheet 310 and the second sheet 320 may be coupled to each other on an upper side and a lower side of the buffer member 300 as shown in FIG. 4.

A plurality of fluid buffer layers 330 are formed, and when the first sheet 310 and the second sheet 320 are coupled to each other, each fluid buffer layer 330 is formed between the first sheet 310 and the second sheet 320. Here, referring to FIG. 3, the fluid buffer layer 330 may be formed in a shape protruding toward the upper side and the lower side of the buffer member 300. The fluid buffer layers 330 may have any suitable shape, in accordance with the present disclosure.

The fluid 400 (refer to FIG. 4) is drawn into the fluid buffer layer 330, and the fluid buffer layer 330 is provided such that the fluid 400, for example, air, is drawn into the fluid buffer layer 330 to buffer the battery cell 110 when swelling of the battery cell 110 occurs.

In addition, the channels 340 are provided to connect the plurality of fluid buffer layers 330 to each other. When the plurality of fluid buffer layers 330 are connected to each other by the channels 340, if swelling of the battery cell 110 occurs and the battery cell 110 pressurizes some of the plurality of fluid buffer layers 330, the fluid 400 existing in the fluid buffer layer 330 that is pressurized by the battery cell 110 moves to the other fluid buffer layer 330 that is not pressurized.

That is, the channels 340 connect the plurality of fluid buffer layers 330 to each other so that the fluid 400 may move between the plurality of fluid buffer layers 330.

For example, referring to FIG. 6, when swelling occurs on the left side of the battery cell 110 with respect to FIG. 6, the fluid buffer layer 330 in contact with the battery cell 110 on the left side is pressurized by the battery cell 110, and the fluid 400 moves from the fluid buffer layer 330 on the left to the fluid buffer layer 330 on the right that is not pressurized.

Also, referring to FIG. 7, when swelling occurs at the center of the battery cell 110 with respect to FIG. 7, the fluid buffer layer 330 in contact with the battery cell 110 at the center is pressurized by the battery cell 110, and the fluid 400 moves from the center to the fluid buffer layers 330 on the left and right that are not pressurized.

Referring to FIG. 2, because the plurality of fluid buffer layers 330 are arranged horizontally and vertically between the first and second sheets 310 and 320 having a rectangular shape, even if the fluid buffer layer 330 is not pressurized in any one part, the fluid 400 may move to the variety of fluid buffer layers 330 in horizontal and vertical positions that are not pressurized.

This is similar to a method in which when any one part of an air mattress is pressurized, another part of the air mattress is buffered while air moves to the other part. For convenience of explanation, although a change in the size of the fluid buffer layer 330 according to the movement of the fluid 400 is excessively shown in FIGS. 6 and 7, even if any one part of the battery cell 110 is expanded, the fluid buffer layer 330 of the corresponding part is pressurized, and the fluid 400 in the fluid buffer layer 330 moves to the other fluid buffer layer 330, the actual change in the size of the fluid buffer layer 330 is not excessive as shown in FIGS. 6 and 7.

Because, as shown in FIG. 2, the plurality of fluid buffer layers 330 are arranged in horizontal and vertical directions, even if any one of the fluid buffer layers 330 is pressurized, or some of the fluid buffer layers 330 of the corresponding part are pressurized together, the fluid 400 present in the pressurized fluid buffer layer 330 is dispersed in the multiple fluid buffer layers 330 in horizontal and vertical directions through the plurality of channels 340, that is, a first channel 341 and a second channel 342, the actual change in the shape of the fluid buffer layer 330 is small.

Meanwhile, assuming that swelling occurs in the battery cell 110 and the initial absolute size of the fluid buffer layer 330 pressurized by the battery cell 110 in that part is, for example, "5", after the fluid 400 of the pressurized fluid buffer layer 330 moves to the other fluid buffer layer 330 in a part where swelling does not occur, the initial absolute size of the pressurized fluid buffer layer 330 may be reduced to "3".

In addition, assuming that the initial absolute size of the fluid buffer layer 330 of the part where swelling does not occur in the battery cell 110 is pressurized by the battery cell 110 is, for example, "1", after the fluid 400 moves from the fluid buffer layer 330 pressurized by swelling occurred in the battery cell 110 to the fluid buffer layer 330 in the part where swelling does not occur, the absolute size of the fluid buffer layer 330 of the part where swelling does not occur may be increased to "3".

That is, in the battery module 10 according to an embodiment of the present disclosure, when swelling of the battery cell 110 occurs, the fluid 400 is dispersed and moves in various directions through the plurality of channels 340 from the fluid buffer layer 330 pressurized by the battery cell 110 to the plurality of other fluid buffer layers 330 that are not pressurized, and thus the same pressure may be applied to the entirety of the part where the swelling occurs in the battery cell 110 and the part where the swelling does not occur.

Also, accordingly, there is an effect of preventing stress from being concentrated on any one part of the battery cell 110 and preventing the battery cell 110 from being partially degraded.

Referring to FIGS. 2 and 3, the plurality of channels 340 may be provided, and the plurality of channels 340 may be connected in all directions of the fluid buffer layer 330.

For example, the plurality of channels 340 may be provided such that the first channel 341 of the plurality of channels 340 connects the plurality of fluid buffer layers 330 to each other, and the second channel 342 of the plurality of channels 340 connects any one of the plurality of fluid buffer layers 330 and the first channel 341.

Here, the first channel 341 and the second channel 342 may be vertically connected to each other. As described above, all of the plurality of fluid buffer layers 330 may be communicatively connected to each other through the first channel 341 and the second channel 342.

Accordingly, the fluid 400 present in the fluid buffer layer 330 pressurized when swelling of the battery cell 110 occurs may be dispersed and moved to the plurality of other fluid buffer layers 330.

That is, when the battery cell 110 swells due to ae swelling phenomenon of the battery cell 110, the fluid 400 present in any of the plurality of fluid buffer layers 330 moves to the other fluid buffer layer 330 by the pressure transferred from the battery cell 110 through the first channel 341 or the second channel 342.

Meanwhile, the fluid buffer layer 330 may be formed in a symmetrical shape as in FIG. 4, or in an asymmetrical shape as in FIG. 5, with respect to a coupling portion of the first sheet 310 and the second sheet 320.

Hereinafter, the operation and effect of the battery module 10 according to an embodiment of the present disclosure will be described with reference to the drawings.

The buffer member 300 is provided on the cover 200 of the battery module 10 according to an embodiment of the present disclosure. The buffer member 300 is provided such that the plurality of fluid buffer layers 330 are connected to each other in the horizontal and vertical directions through the channels 340, and when any one of the fluid buffer layers 330 is pressurized by swelling of the battery cell 110, the fluid 400 present in the fluid buffer layer 330 is dispersed and moves to the other fluid buffer layer 330 that is not pressurized, so that a uniform pressure is applied to the entire battery cell 110.

Accordingly, there is an effect of preventing stress from being concentrated on any one part of the battery cell 110 and preventing the battery cell 110 from being partially degraded.

Meanwhile, a battery pack (not shown) according to an embodiment of the present disclosure may include one or more battery modules 10 according to an embodiment of the present disclosure as described above. In addition, the battery pack (not shown) may further include a case accommodating the battery module 10, and various devices controlling the charging and discharging of the battery module 10, such as a BMS, a current sensor, a fuse, etc., in addition to the battery module 10.

Meanwhile, a vehicle (not shown) according to an embodiment of the present disclosure may include the battery module 10 or the battery pack (not shown) described above. The battery pack (not shown) may include the battery module 10. In addition, the battery module 10 according to an embodiment of the present disclosure may be applied to a vehicle (not shown), for example, a predetermined vehicle (not shown) provided to use electricity such as an electric vehicle or a hybrid vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery module, and a battery pack and a vehicle including the same, and in particular, may be applicable to an industry related to a secondary battery.

What is claimed is:

1. A battery module comprising:
   a cover;
   a battery cell stack in the cover, the battery cell stack comprising a plurality of battery cells;
   a buffer member in contact with the battery cell stack,
   wherein the buffer member is configured to communicate fluid in the buffer member, wherein the buffer member comprises:
   a first sheet;
   a second sheet coupled to the first sheet;
      a plurality of fluid buffer layers formed between the first sheet and the second sheet, the plurality of fluid buffer layers being configured to receive the fluid; and
      a channel formed by directly connecting a first channel to a second channel, the channel connects a first fluid buffer layer of the plurality of fluid buffer layers to two adjacent fluid buffer layers of the plurality of fluid buffer layers, the channel configured to communicate the fluid between the first fluid buffer layer and the two adjacent plurality of fluid buffer layers.

2. The battery module of claim 1, wherein the first sheet and the second sheet are film sheets facilitating thermal bonding.

3. The battery module of claim 1, further comprising a plurality of channels including the channel, and
   wherein the plurality of channels connect the plurality of fluid buffer layers.

4. The battery module of claim 3,
   wherein the first channel of the plurality of channels connects the first fluid buffer layer of the plurality of fluid buffer layers to a second fluid buffer layer of the plurality of fluid buffer layers, and
   wherein the second channel of the plurality of channels connects a third fluid buffer layer of the plurality of fluid buffer layers to the first channel.

5. The battery module of claim 4, wherein all of the plurality of fluid buffer layers are communicatively connected to each other through the first channel and the second channel, and
   wherein a fluid present in one fluid buffer layer of the plurality of fluid buffer layers moves to another fluid buffer layer of the plurality of fluid buffer layer through at least one of the first channel and the second channel when one of the plurality of battery cells swells.

6. The battery module of claim 4, wherein a direction of the first channel connected to the second channel is perpendicular to a direction of the second channel.

7. The battery module of claim 1, wherein the plurality of fluid buffer layers is formed in a symmetrical shape or an asymmetrical shape between the first sheet and the second sheet.

8. A battery pack, comprising the battery module according to claim 1.

9. A vehicle, comprising the battery module according to claim 1.

10. The battery module of claim 1, wherein a fluid buffer layer is formed of an ellipse shape.

11. The battery module of claim 1, wherein at least one channel comprises another second channel directly connected to the first channel, the another second channel connects a fluid buffer layer to a fourth fluid buffer layer of the plurality of fluid buffer layers.

\* \* \* \* \*